(12) United States Patent
Murai et al.

(10) Patent No.: US 6,525,529 B2
(45) Date of Patent: Feb. 25, 2003

(54) METHOD AND APPARATUS FOR DETECTING BROKEN TEETH IN A PULSE SIGNAL OF A WHEEL SPEED SENSOR FOR AN ABS VEHICLE STABILIZATION SYSTEM

(75) Inventors: Takayasu Murai, Hamakita (JP); Noboro Kokonobira, Hamakita (JP); Hiroyuki Kamiya, Hamakita (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

(21) Appl. No.: 09/800,771

(22) Filed: Mar. 6, 2001

(65) Prior Publication Data

US 2002/0125880 A1 Sep. 12, 2002

(51) Int. Cl.7 .................................................. G01P 3/48
(52) U.S. Cl. ........................ 324/166; 324/225; 73/117.3
(58) Field of Search ................................ 324/166, 160, 324/207.25, 207.22, 225, 161; 73/117.3, 116; 364/431.07, 431.08

(56) References Cited

U.S. PATENT DOCUMENTS 4,814,704 A * 3/1989 Zarrien, Jr. et al. ........ 73/117.3
5,481,909 A * 1/1996 Deutsch et al. ............ 73/117.3

* cited by examiner

Primary Examiner—Edward Lefkowitz
Assistant Examiner—Subhash Zaveri
(74) Attorney, Agent, or Firm—Seed IP Law Group PLLC

(57) ABSTRACT

A device and a method to detect a broken tooth in a pulse signal by measuring one pulse cycle and another pulse cycle, determining whether a ratio of one pulse cycle and another pulse cycle is a multiplied number while wheel speed is constant.

14 Claims, 6 Drawing Sheets

METHOD AND APPARATUS FOR DETECTING BROKEN TEETH IN A PULSE SIGNAL OF A WHEEL SPEED SENSOR FOR AN ABS VEHICLE STABILIZATION SYSTEM

TECHNICAL FIELD

This invention generally relates to rotational velocity sensors, and more particularly to pulse signals corresponding to rotational velocity, for example pulse signals generated via a wheel speed sensor for a motor vehicle.

BACKGROUND OF THE INVENTION

Applicants are unaware of any logistic systems that actually detect a broken tooth in a pulse signal. Instead, traditionally, a rapid wheel speed change due to a broken tooth in a pulse signal or missing/deviation of a wheel sensor has been determined by utilizing changes in a wheel speed acceleration. For example, there exists a method of detecting a failure of a wheel speed sensor typically due to a broken tooth by utilizing unusual rapid changes in a wheel speed when a phenomenon satisfies a predetermined condition.

The aforementioned traditional method reserves a certain degree of tolerance in a threshold value of ascertaining the failure in the wheel speed sensor in order to avoid a false detection. For that reason, there exists a difficulty in detecting a minor failure, and a few broken teeth of the wheel speed sensor might not have triggered the detection of such failure. Further, the traditional method typically cannot detect broken teeth the result from an eccentricity and/or iron powder adhesion typical but unique for an active sensor.

SUMMARY OF THE INVENTION

It is an object of this invention to provide a method or device facilitating a detection of a broken tooth in a pulse signal.

In a first aspect, a method of detecting a broken tooth in a pulse signal includes measuring one pulse cycle and another pulse cycle in almost constant speed, and determining whether a ratio of the one pulse cycle and the another pulse cycle is a multiplied number.

In a second aspect a method of detecting a broken tooth in a pulse signal as above, further includes measuring the one pulse cycle and N times of pulse cycle in case that the number of sensing teeth is N, and a step of comparing measured values of the one pulse cycle and N times of pulse cycle.

In a third aspect a method of detecting a broken tooth in a pulse signal as above, further includes counting the number of the instances when the ratio of one pulse cycle and the another pulse cycle is a multiplied number, and a step of detecting a broken tooth if a counted value is a predetermined counting value or more In a fourth aspect a method of detecting a broken tooth in a pulse signal as above, further includes counting the number of the instances when the ratio of one pulse cycle and the another pulse cycle is almost an odd-multiplied number at every counter, and a step of detecting a broken tooth if a counted value is a predetermined counting value or more.

In yet a further aspect a device for detecting a broken tooth in a pulse signal comprising a pulse cycle measuring means to measure one pulse cycle and another pulse cycle in almost constant speed, a comparing means to determine whether a ratio of one pulse cycle and another pulse cycle is a multiplied number, a counter counting the number of the instances when ratio of said one pulse cycle and another pulse cycle is a multiplied number, and a judging means to detect a broken tooth if a counted value is a predetermined counting value or more.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF THE INVENTION

An illustrated embodiment of this invention is presented in the environment of a brake control system for a motor vehicle and is explained with reference to the accompanying drawings.

Summary of Brake Control for a Motor Vehicle

Figure 1:
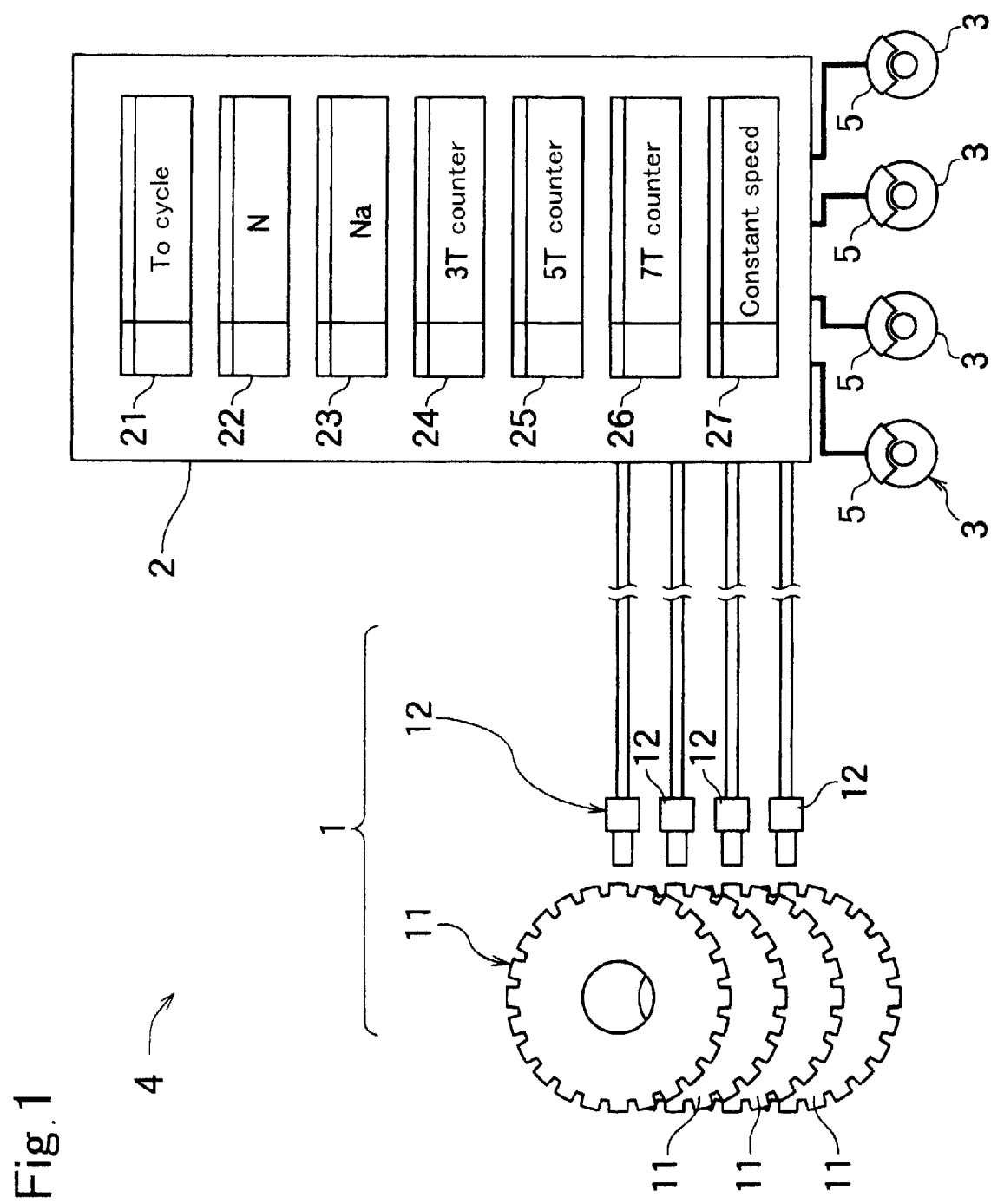
FIG. 1 is a partial schematic diagram and partial block diagram showing a wheel speed sensor, wheels and processor according to an illustrated embodiment of the invention.

FIG. 1 shows a wheel control device 4 for a motor vehicle including a wheel speed sensor 1 for measuring a rotational speed of a wheel 3 and an arithmetic and control unit 2 such as a microprocessor for controlling hydraulic pressure to a wheel via a brake 5. The wheel speed sensor 1 comprises a sensor ring 11 rotating together with a wheel 3, a steering sensor 11 rotating together with a wheel, and a sensor element 12 sensing the teeth of the sensor ring 11.

Wheel Speed Sensor

FIG. 1 shows a wheel speed sensor 1 including a sensor ring 11 rotatably mounted on a hub and a sensor element 12 positioned for measuring a rotation of the sensor ring 11. The wheel speed sensor 1 may be an active sensor or a passive sensor.

The active sensor measures a rotational speed of the sensor ring 11 by detecting the passing of a plurality of magnets positioned around the sensor ring 11. The sensor element 12 includes a number of magnetic detecting elements, such as a magnetic resistance element and hole element, located in the vicinity of a periphery of the sensor ring 11. The magnetic detecting elements sense a magnetism generated from magnets carried by the sensor ring 11, thus detecting the rotational speed of the sensor ring 11.

The passive sensor measures a rotational speed of the sensor ring 11 by detecting a variation of magnetic resistance. A magnetic resistance circuit controls the magnetic resistance in response to the passing of convex-concave teeth on the periphery of the sensor ring 11. The sensor element 12 takes the form of an electromagnetic induction type sensor that includes the magnetic resistance circuit with a gap in the vicinity of the periphery of the sensor ring 11. The gap opens or closes the magnetic resistance circuit when convex-concave teeth on the periphery of the sensor ring 11 come close to the gap. Thus, the magnetic resistance circuit varies the magnetic resistance, outputting an electric signal in response to the opening and closing, i.e., variation of magnetic resistance.

Particularly for the active sensor, the sensor ring 11 is prone to accumulate debris such as iron powder from a brake shoe 5 or the like, thereby narrowing the clearance for mounting the sensor element 12, and ultimately possibly causing a broken tooth in the pulse signal due to the eccentricity of the rotor.

Generation of Pulse Signal

Figure 2:
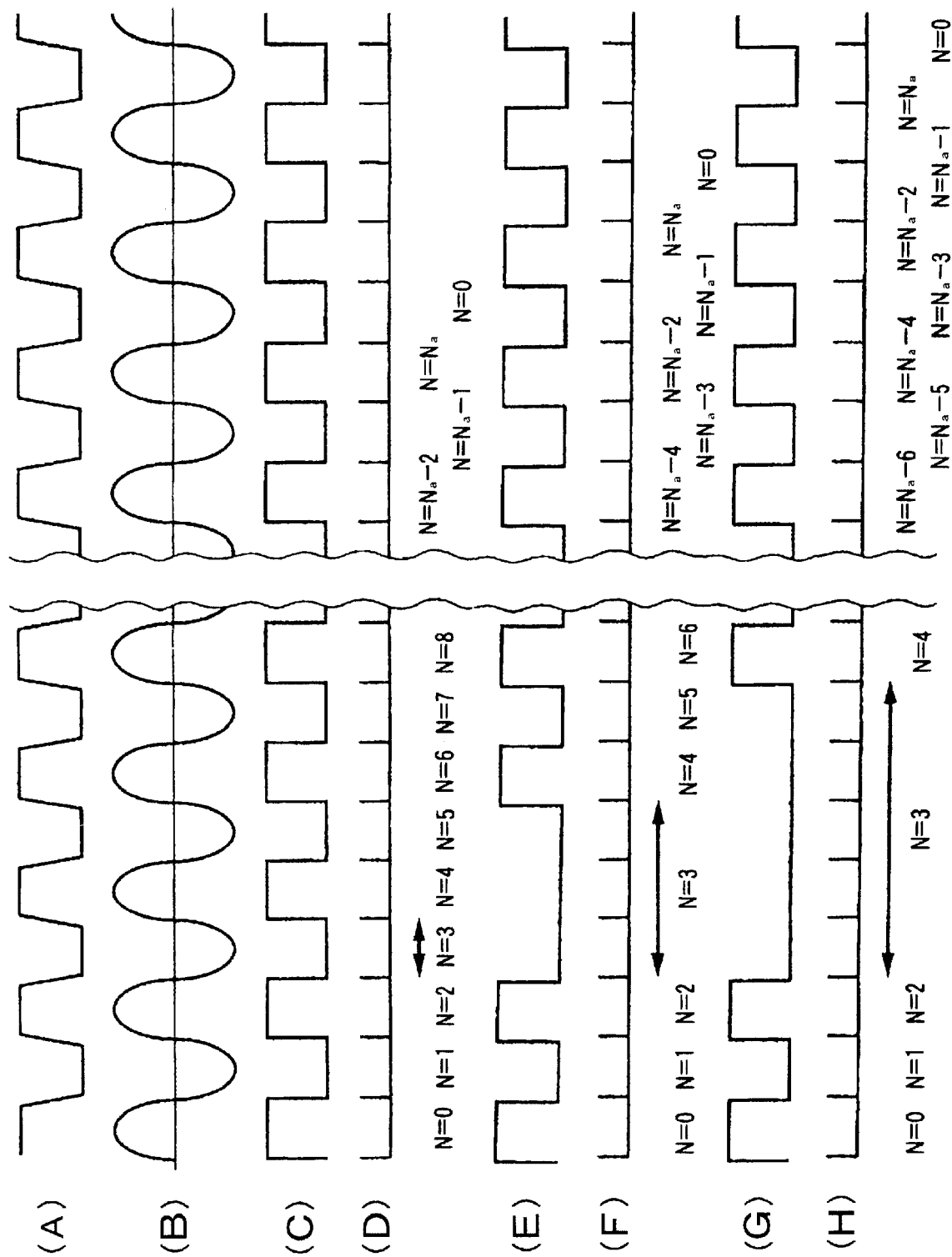
FIG. 2 is a schematic diagram showing a number of waveforms produced by the wheel speed sensor.

FIG. 2 shows a timing relationship between the location of a tooth (A) on the sensor ring 11 with respect to the sensor element 12 and a number of signals (B–H) generated by the various elements of the wheel control device 4. For example, the passive form of the sensor element 12, discussed above, generates a passive waveform (B). Also for example, the active form of the sensor element 12, also discussed above, generates an active waveform (C). Further, the arithmetic processing unit 2 generates a pulse signal (D) in correspondence with the respective tooth location (A) by treating electric signals of the passive waveform (B) or active waveform (C) from the sensor element 12 via a circuit such as a waveform shaping circuit (not shown in FIG. 2). Thus, the pulse signal (D) is generated in response to the timing of the rising and falling of the electric signal (B, C) from the sensor element 12. (The pulse signals are represented by the count values below the line, while the pulse cycles are represented by the vertical bars extending from the line.)

Broken Tooth in a Pulse Signal

If a pulse signal includes one broken tooth, as shown in FIG. 2(E), since a pulse signal is generated due to the timing of rising and falling of an electric signal, the corresponding duration between pulses in the pulse signal is three pulse cycles long, as represented by the double headed arrow in the count of FIG. 2(F). If a pulse signal includes two broken teeth, as shown in FIG. 2(G), the corresponding pulse signal is five pulse cycles long, as represented by the double headed arrow in the count of FIG. 2(H).

During the time that a wheel 3 is rotating at a constant speed, a rotation speed of the sensor ring 11 is also constant. Under this condition, measuring a cycle of pulse signals provides essential information in that the number of pulse cycles included in one pulse signal varies and increases to an odd multiple (not including 1) if the pulse signal includes one or more broken teeth.

When generating a pulse signal only out of the rising and falling of the electric signals from the sensor element 12, the number of pulse cycles included in one pulse signal varies, and increases to an integral multiplied number (not including 1) if the pulse signal includes one or more broken teeth.

A method of detecting a broken tooth in a pulse signal is explained below.

Measuring a Pulse Cycle

A determination of the broken tooth in a pulse signal is conducted by the arithmetic processing unit 2, which is explained with reference to an example employing the active sensor waveform (C) in FIG. 2.

The arithmetic processing unit 2 is configured with a pulse counter 21 for counting the number of cycles of a random pulse $T_0$, a teeth counter 22 for counting a random number of counted teeth N, a teeth number register 23 for storing a value equal to the number of sensor ring teeth $N_a$ on the sensor ring 11, a 3T counter 24, a 5T counter 25, a 7T counter 26, and the respective register for a constant speed flag 27. The arithmetic processing unit 2 can include respective counters for 9T or more, which are not illustrated in the interest of brevity. The number of teeth $N_a$ of the sensor ring 11 is pre-recorded in the teeth number register 23.

Figure 3:
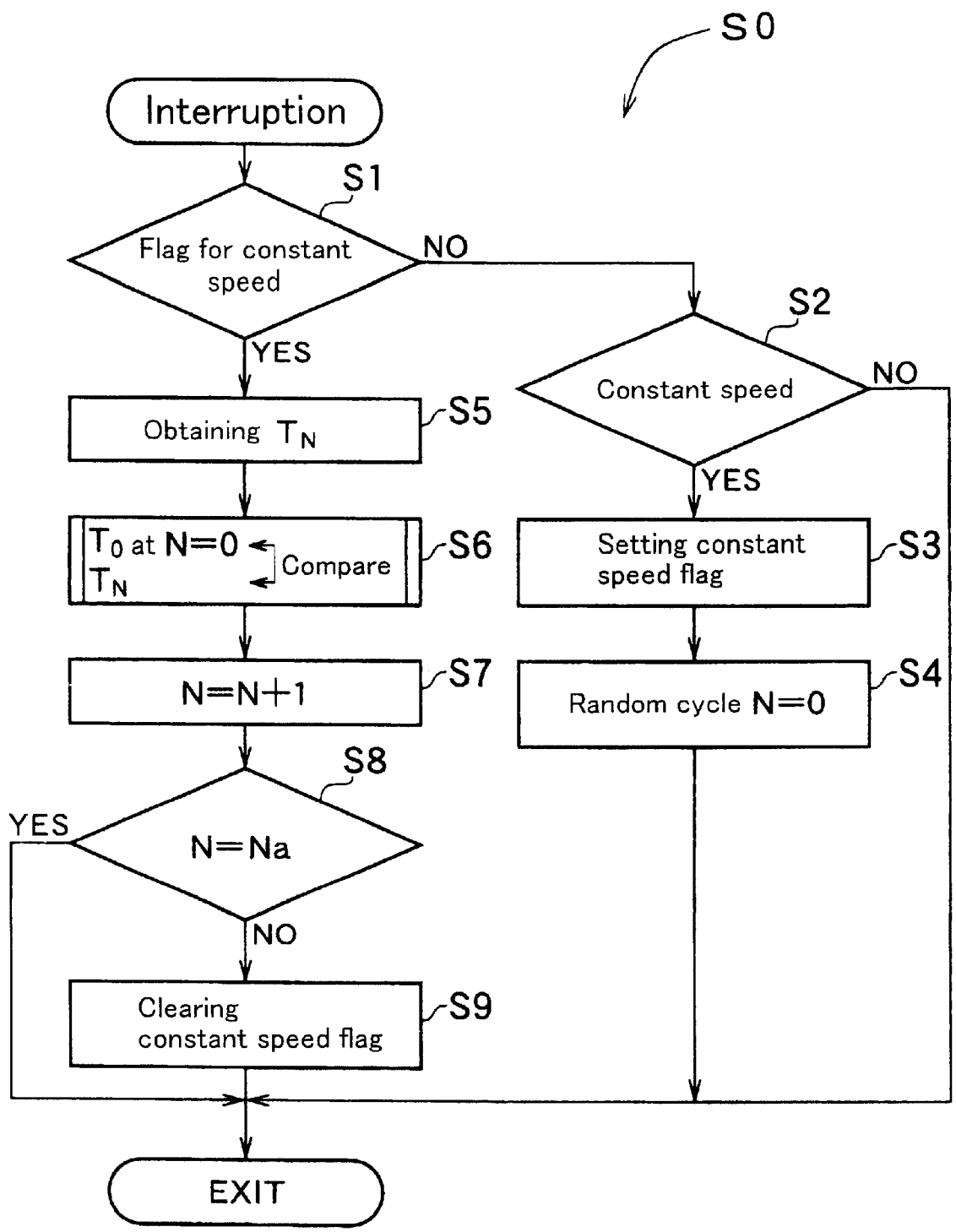
FIG. 3 is a flowchart of interruption process for broken tooth detection.

A first step is to determine whether the vehicle speed is constant or not, and then to measure the pulse cycle if the speed is constant. For that purpose, an interruption process S0, shown in FIG. 3, is conducted.

In a first step S1, the constant speed flag 27 is checked. In a second step S2, a determination is made of whether the vehicle speed is constant, if no flag 27 is set. The constant speed flag 27 is set if the vehicle speed is constant, in a step S3. In step S4, a random pulse cycle $T_0$ is defined as N=0.

If the constant speed flag 27 is set in the step S1, then a pulse cycle $T_N$ is determined in a step S5. The determined pulse cycle $T_N$ is compared with the random cycle $T_0$ in a step S6. After the comparison in the step 6, the teeth counter 22 is incremented (i.e., N=N+1) in step S7. In step S8, it is determined whether N is equal to the total number of sensor ring teeth $N_a$. If N is not equal to $N_a$, the constant speed flag is cleared for the purpose of determining another pulse cycle in a step S9. Then, if the vehicle is driving at a constant speed, the above-described steps are to be repeated until N equals $N_a$, the total number of teeth on the sensor ring 11, and another pulse cycle $T_N$ is to be determined.

Figure 4:
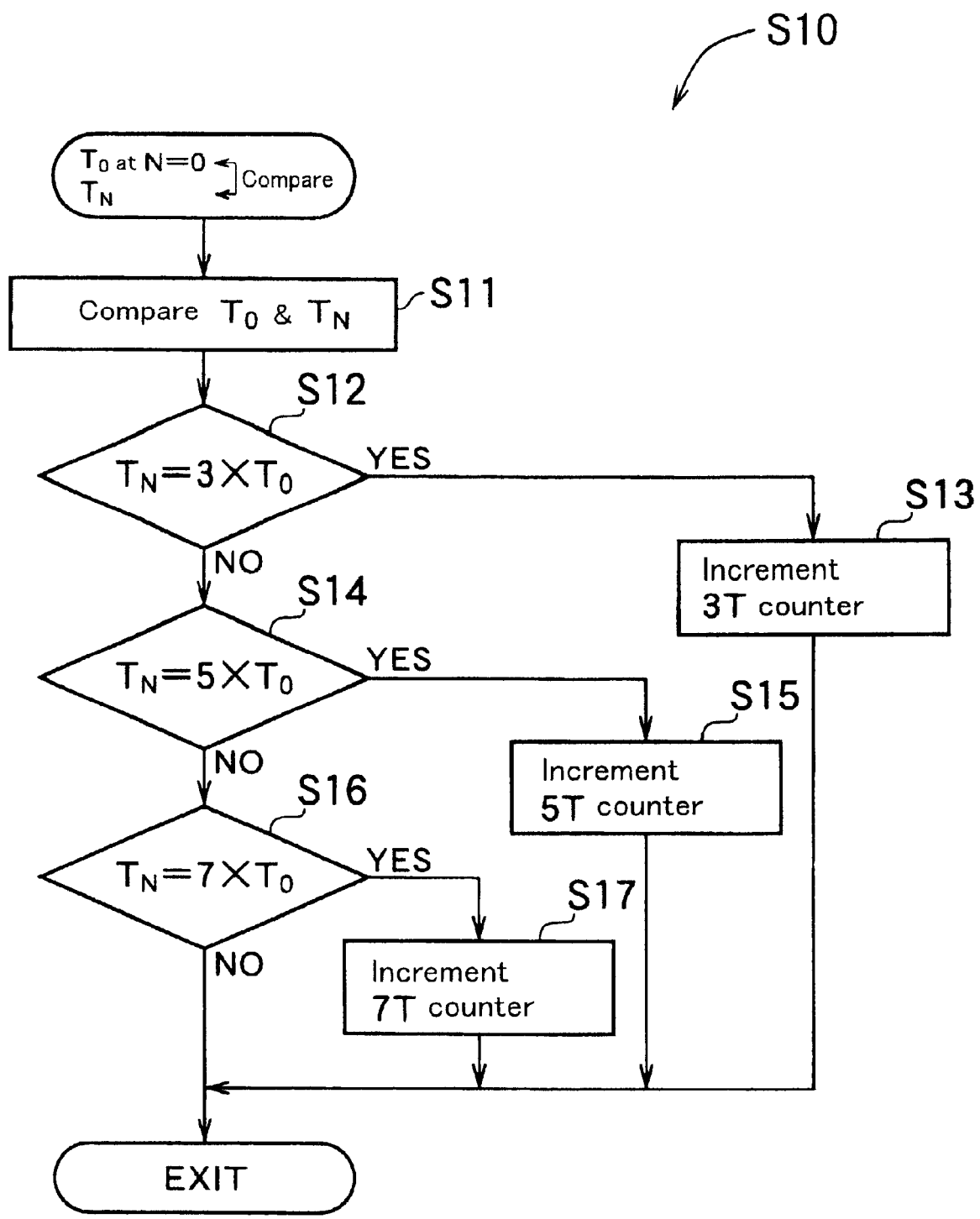
FIG. 4 is a flowchart of comparison with respect to pulse cycles of pulses $T_0$ and $T_N$.

Comparison Between the Random Pulse Cycle $T_0$ and the Pulse Cycle $T_N$ Located at a Number N A process S10 of comparing the random pulse cycle $T_0$ and the pulse cycle $T_N$ located at a number N is illustrated in FIG. 4.

In step S11, $T_0$ and $T_N$ are compared. In step S12, it is determined if $T_N=3\times T_0$. If $T_N=3\times T_0$ the 3T counter 24 is incremented in response to the one broken tooth in a step S13. In step S14, it is determined if $T_N=5\times T_0$. If $T_N=5\times T_0$, the 5T counter 25 is incremented by one in response to the two broken teeth in a step S15. Further, in step S16, it is determined if $T_N=7\times T_0$. If $T_N=7\times T_0$, the 7T counter 26 is incremented by one in response to the three broken teeth in a step S17. Although no such counter appears in FIG. 4, if there exists four or more broken teeth, an applicable counter such as the 9T counter for four broken teeth is incremented by one. However, if no broken tooth is found, this routine is ended. Accordingly, if there exists a broken tooth, an appropriate counter goes up in response to the applicable number of brokenteeth, and the number of failures in response to the broken tooth is registered.

Judgment of Failure

Figure 5:
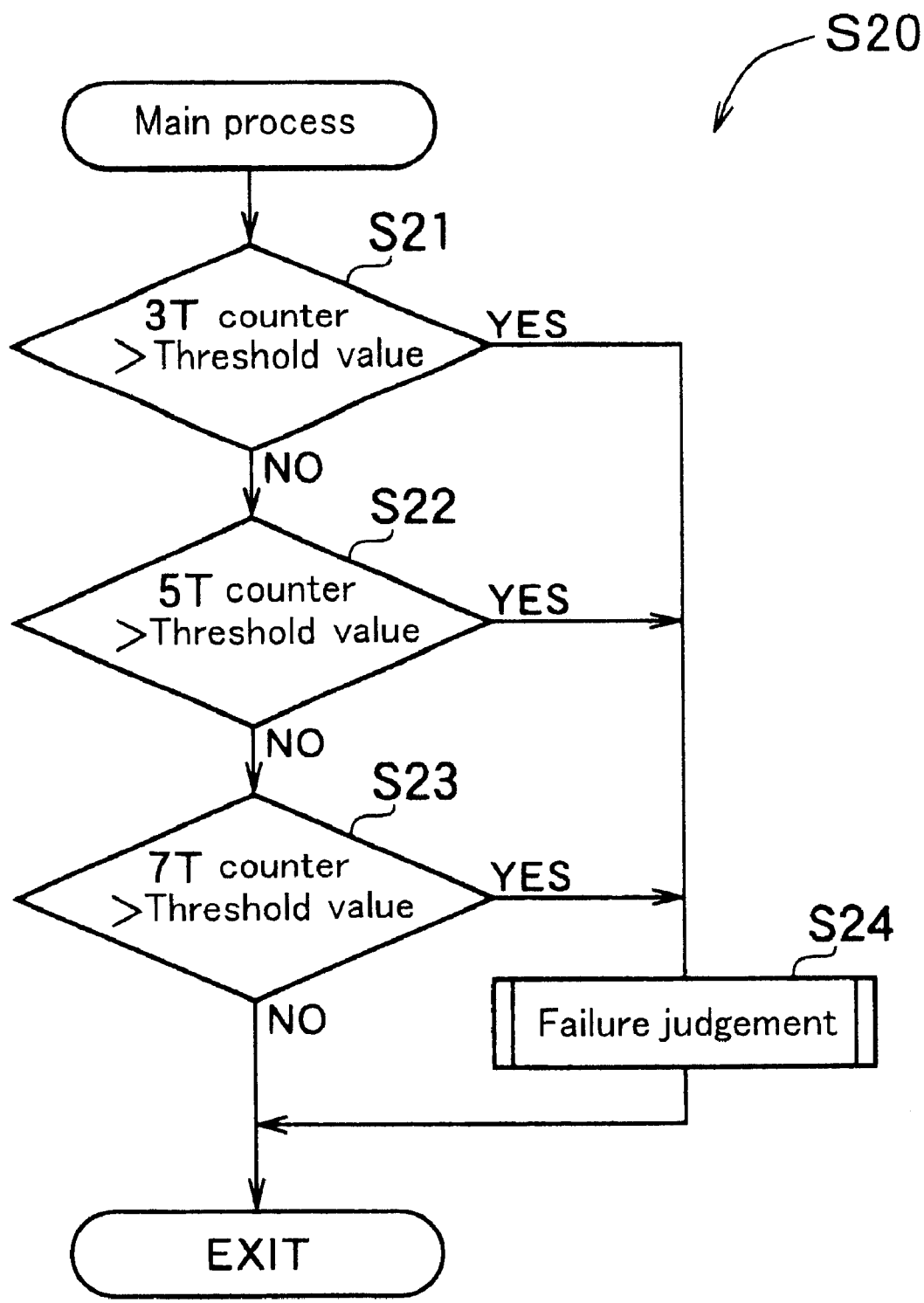
FIG. 5 is flowchart of a main process for broken tooth detection.

Referring to the result of the process in FIG. 4, judgment of failure during a main routine S20 is conducted following the process illustrated in FIG. 5. The judgment is conducted by setting a threshold value in correspondence with a condition of broken tooth and determining whether counts of the respective counters for broken teeth 24, 25, 26 exceeds the threshold value or not in steps S21 through S23. If the value of any one of the counters 24, 25, 26 exceeds the threshold value, a failure judgment is conducted in a step S24, for example by producing an appropriate notification. Although not shown in FIG. 5, if there are four or more broken teeth found, the failure judgment is also conducted. The failure judgment process differs in deferent vehicle control system such as anti-lock brake system control (hereinafter ABS control) and braking force distribution control, which may, for example, result in prohibition of ABS control, system shutdown or other appropriate action.

Time Chart for Failure Judgment

Figure 6:
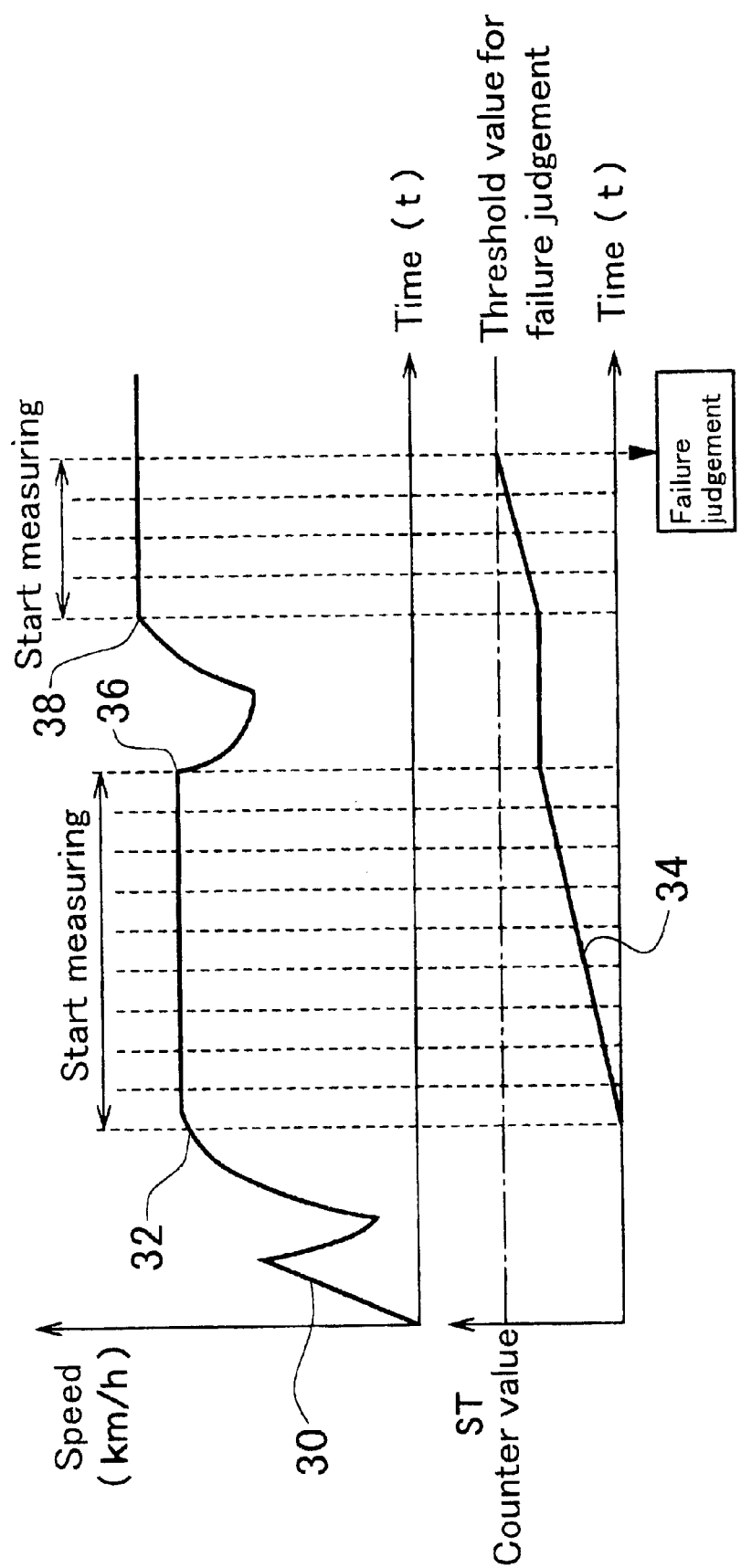
FIG. 6 is a schematic diagram showing a time chart for the failure judgment.

The process described above is illustrated in a time chart of FIG. 6. If the vehicle speed 30 becomes constant, as shown at point 32, measurement of the pulse cycle is initiated. For the example employing the pulse cycle of FIG.

2F, the 5T counter is incremented each time the two broken teeth are found as represented by the line 34. The measurement will be repeated until the number of samples is equal to the number of sensor ring teeth $N_a$, illustrated at point 36. Then, the measurement is held until the vehicle speed becomes constant again, illustrated at point 38, and measurement begins again. Similar to the above, when two broken teeth are found, the 5T counter is again incremented by one. When the count of the 5T counter 25 exceeds the threshold value of the failure judgment, the failure judgment is initiated.

This invention may have one or more of the following advantages. This invention may facilitate the detection of broken tooth in a pulse signal of the wheel speed sensor. This invention may also facilitate the detection of broken tooth in a pulse signal of the wheel sped sensor occurs especially because of the rotor eccentricity of the active sensor and adhesion of iron powder.

It is readily apparent that the above-described invention has the advantages of wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

What we claim is:

1. The method of detecting a broken tooth in a pulse signal comprising
    a step of measuring one pulse cycle and another pulse cycle in almost constant speed,
    a step of determining whether a ratio of said one pulse cycle and said another pulse cycle is an odd integral multiple, other than 1.

2. The method of detecting a broken tooth in a pulse signal according to the claim 1, further comprising
    a step of counting the number of the instances when said ratio of one pulse cycle and said another pulse cycle is an odd integral multiple, other than 1, and
    a step of detecting a broken tooth if a counted value is at least equal to a predetermined counting value.

3. The method of detecting a broken tooth in a pulse signal according to claim 1, further comprising
    a step of counting the number of the instances when said ratio of one pulse cycle and said another pulse cycle is almost an odd-multiplied number at every counter, and
    a step of detecting a broken tooth if a counted value is a predetermined counting value or more.

4. A device for detecting a broken tooth in a pulse signal comprising:
    a pulse cycle measuring means to measure one pulse cycle and another pulse cycle in almost constant speed,
    a comparing means to determine whether a ratio of said one pulse cycle and said another pulse cycle is a multiplied number,
    a counter counting the number of the case when said ratio of said one pulse cycle and said another pulse cycle is a multiplied number, and
    a judging means to detect a broken tooth if a counted value is at least equal to a predetermined counting value.

5. A method of detecting faulty measurements in a pulse modulated rotational speed sensing system, comprising:
    determining a first pulse cycle count for a first pulse while a rotation of a sensor ring is at a first constant rotational velocity;
    determining a second pulse cycle count for a second pulse while the rotation of the sensor ring is at the first constant rotational velocity;
    determining whether a ratio of the first pulse cycle count and the second pulse cycle count is an odd integer other than 1.

6. The method of claim 5, further comprising:
    incrementing a respective counter corresponding to the value of the ratio each time the ratio is an odd integer other than 1.

7. The method of claim 5, further comprising:
    incrementing a respective counter corresponding to the value of the ratio each time the ratio is an odd integer other than 1;
    comparing a count in the respective counter to a threshold value; and
    producing a faulty measurement indication if the count exceeds the threshold value.

8. The method of claim 5, further comprising:
    incrementing a respective counter corresponding to the value of the ratio of the first pulse cycle count and the second pulse cycle count if the ratio is an odd integer other than 1;
    determining a third pulse cycle count for a third pulse while a rotation of a sensor ring is at a second constant rotational velocity;
    determining a fourth pulse cycle count for a fourth pulse while the rotation of the sensor ring is at the second constant rotational velocity;
    determining whether a ratio of the third pulse cycle count and the fourth cycle pulse count is an odd integer other than 1; and
    incrementing a respective counter corresponding to the value of the ratio of the third pulse cycle count and the fourth pulse cycle count if the ratio is an odd integer other than 1.

9. The method of claim 5 wherein the first constant rotational velocity is the same as the second constant rotational velocity.

10. The method of claim 5 wherein the first constant rotational velocity is different from the second constant rotational velocity.

11. The method of claim 5, further comprising:
    repeating the steps of claim 5 for additional pulses when the sensor ring is at constant rotational velocity.

12. A pulse modulated rotational speed sensing system, comprising:
    a sensor ring mounted for rotation and having a number of teeth;
    a sensor positioned to sense the passage of the teeth of the sensor ring;
    a counter for counting pulse cycles during a first pulse and a second while the sensor ring has a constant rotational velocity;
    a processor programmed to determine whether a ratio of the first pulse cycle count and the second pulse cycle count is an odd integer other than 1.

13. The pulse modulated rotational speed sensing system of claim 12 wherein the processor is further programmed to:
    increment a respective counter corresponding to the value of the ratio of the first pulse cycle count and the second pulse cycle count if the ratio of the first pulse cycle count and the second pulse cycle count is an odd integer other than 1.

14. The pulse modulated rotational speed sensing system of claim 12 wherein the processor is further programmed to:

increment a respective counter corresponding to the value of the ratio of the first pulse cycle count and the second pulse cycle count if the ratio of the first pulse cycle count and the second pulse cycle count is an odd integer other than 1;

compare a count in the respective counter to a threshold value; and produce a faulty measurement indication if the count exceeds the threshold value.

* * * * *